US010351760B2

(12) United States Patent
Schultheiss et al.

(10) Patent No.: US 10,351,760 B2
(45) Date of Patent: Jul. 16, 2019

(54) POLYMERIC IONIC LIQUID CLAY CONTROL AGENTS

(71) Applicant: Halliburton Energy Services, Inc., Houston, TX (US)

(72) Inventors: Nathan Carl Schultheiss, Kingwood, TX (US); Humberto Almeida Oliveira, The Woodlands, TX (US); Chandra Sekhar Palla-Venkata, Sugar Land, TX (US); Zheng Lu, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/318,226

(22) PCT Filed: Jul. 15, 2014

(86) PCT No.: PCT/US2014/046655
§ 371 (c)(1),
(2) Date: Dec. 12, 2016

(87) PCT Pub. No.: WO2016/010520
PCT Pub. Date: Jan. 21, 2016

(65) Prior Publication Data
US 2017/0190954 A1    Jul. 6, 2017

(51) Int. Cl.
E21B 21/00    (2006.01)
E21B 33/14    (2006.01)
(Continued)

(52) U.S. Cl.
CPC .............. *C09K 8/608* (2013.01); *C09K 8/035* (2013.01); *C09K 8/42* (2013.01); *C09K 8/62* (2013.01);
(Continued)

(58) Field of Classification Search
CPC .......... E21B 21/00; E21B 33/14; E21B 43/26
See application file for complete search history.

(56) References Cited

U.S. PATENT DOCUMENTS 4,393,939 A    7/1983    Smith et al.
5,197,544 A    3/1993    Himes
(Continued)

FOREIGN PATENT DOCUMENTS

CN    103571449 A    2/2014
CN    103897121 A    7/2014
WO    2006136031 A1    12/2006

OTHER PUBLICATIONS

International Search Report and Written Opinion issued in corresponding PCT application No. PCT/US2014/046655, dated Apr. 13, 2015, 2 pgs.
(Continued)

Primary Examiner — Zakiya W Bates
(74) Attorney, Agent, or Firm — Chamberlain Hrdlicka

(57) ABSTRACT

Polymeric clay stabilizers including at least one ionic repeating unit for treatment of subterranean formations. A method of treating a subterranean formation that can include obtaining or providing a composition comprising including a polymeric clay stabilizer including at least one ionic repeating unit, wherein the clay stabilizer has a melting point or glass transition temperature that is equal to or less than 100° C. The method can also include placing the composition in a subterranean formation.

20 Claims, 2 Drawing Sheets

(51) Int. Cl.
*E21B 43/26* (2006.01)
*C09K 8/60* (2006.01)
*C09K 8/035* (2006.01)
*C09K 8/42* (2006.01)
*C09K 8/62* (2006.01)

(52) U.S. Cl.
CPC ............ *E21B 21/00* (2013.01); *E21B 33/14* (2013.01); *E21B 43/26* (2013.01); *C09K 2208/12* (2013.01)

(56) References Cited

U.S. PATENT DOCUMENTS

| | | | |
|---|---|---|---|
| 5,908,814 A | 6/1999 | Patel et al. | |
| 8,084,402 B2 | 12/2011 | Berry et al. | |
| 2012/0202920 A1* | 8/2012 | Marsh ............... | C09D 133/08 523/400 |
| 2014/0166871 A1 | 6/2014 | Jamison et al. | |

OTHER PUBLICATIONS

Anon, "Información téecnica, Callaway C-4515PWG", Downloaded from the Internet on Aug. 9, 2017, <URL: www.kemira.com/en/industries-applications/Pages/bevaloid-and-callaway.aspx>.

Hill et al., SPE 10656: "Clay Stabilization—Criteria for Best Performance," Society of Petroleum Engineers of AIME, 1982: pp. 127-138.

Katz et al., Paper No. 01-3228: "Mechanisms of Soil Stabilization with Liquid Ionic Stabilizer," Transportation Research Record, No. 1757, 2001: pp. 50-57.

Berry et al., SPE 112540: "Performance Evaluation of Ionic Liquids as a Clay Stabilizer and Shale Inhibitor," SPE International, 2008: pp. 1-14.

Yuan et al., "Poly(ionic liquid)s: Polymers expanding classical property profiles," Polymer, 2011, vol. 52: pp. 1469-1482.

Amarasekara et al., "Brönsted Acidic Ionic Liquid 1-(1-Propylsulfonic)-3-methylimidazolium-Chloride Catalyzed Hydrolysis of D-Cellobiose in Aqueous Medium," International Journal of Carbohydrate Chemistry, 2012, vol. 2012: pp. 1-6.

Malik et al., SPE 168107: "A Novel and Cost-Effective Clay Control Approach in Water-Sensitive Sandstone Gas Reservoir of Saudi Arabia during Proppant Fracturing Treatment," SPE International, 2013: pp. 1-13.

* cited by examiner

POLYMERIC IONIC LIQUID CLAY CONTROL AGENTS

BACKGROUND OF THE INVENTION

Swelling clays can be a major mechanism of formation damage due to loss of mobility of hydrocarbon fluids in the formation. When clays encounter foreign water, such as well-treatment fluids or produced water, they can swell, causing a loss of permeability. The swelling can cause portions of the clay and adjacent fines to become mobile within the production stream and, too frequently, encounter constrictions in capillaries, where they can bridge off the capillaries and severely diminish the flow rate of hydrocarbons to the wellbore. Sometimes the loss of permeability observed is due to clay swelling without migration, but often clay swelling is accompanied by migration of clay and other fines. Non-swelling clays may also respond to the foreign water and begin to migrate.

Shale is a fine-grained, fissile, detrital sedimentary rock formed by consolidation of clay- and silt-sized particles into thin, relatively impermeable layers. Some shales encountered during subterranean operations can be sensitive to water, due in part to clay content and the ionic composition of the clay. Such shales, also known as heaving or sloughing shales, can have a tendency to degrade, such as swell or crack, upon contact with various downhole fluids, such as drilling fluids and fracturing fluids. The complications associated with shale degradation during drilling may substantially increase the time and cost of drilling. The degradation of shales in a borehole can render the borehole walls unstable. The heaving shale material can slough and cave into the borehole. Degradation of the shale can interrupt circulation of the drilling fluid and cause greater friction between the drill string and the wellbore. Sloughing of shale material into the borehole can cause the drill stem to become stuck and can enlarge the borehole, with the result that large subterranean cavities are formed. The degradation of the shale may interfere with attempts to maintain the integrity of drilled cuttings traveling up the well bore until such time as the cuttings can be removed by solids control equipment located at the surface. Degradation of drilled cuttings prior to their removal at the surface may prolong drilling time because shale particles traveling up the well bore can break up into smaller and smaller particles, which can expose new surface area of the shale particles to the drilling fluid and lead to further absorption of water and degradation. Where sloughing occurs while the drilling bit is being changed at the surface, the borehole fills up and must be cleared before drilling can proceed. The heaving shale material taken up into the drilling fluid can adversely affect the viscosity characteristics of the drilling fluid to the point where the fluid must be chemically treated to reduce the viscosity thereof or it must be diluted followed by the addition of weighing material to maintain a given mud weight.

Using oil-based fluids instead of aqueous-based fluids is one method of inhibiting clay swelling and shale degradation. However, oil-based fluids are often environmentally undesirable because they may be toxic. Accordingly, environmental regulations enacted by numerous countries have curtailed the use of oil-based fluids. Another method is to use clay stabilizers. However, many clay stabilizers are expensive and are environmentally undesirable due to toxicity or lack of biodegradability, and can cause damage to subterranean formations.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
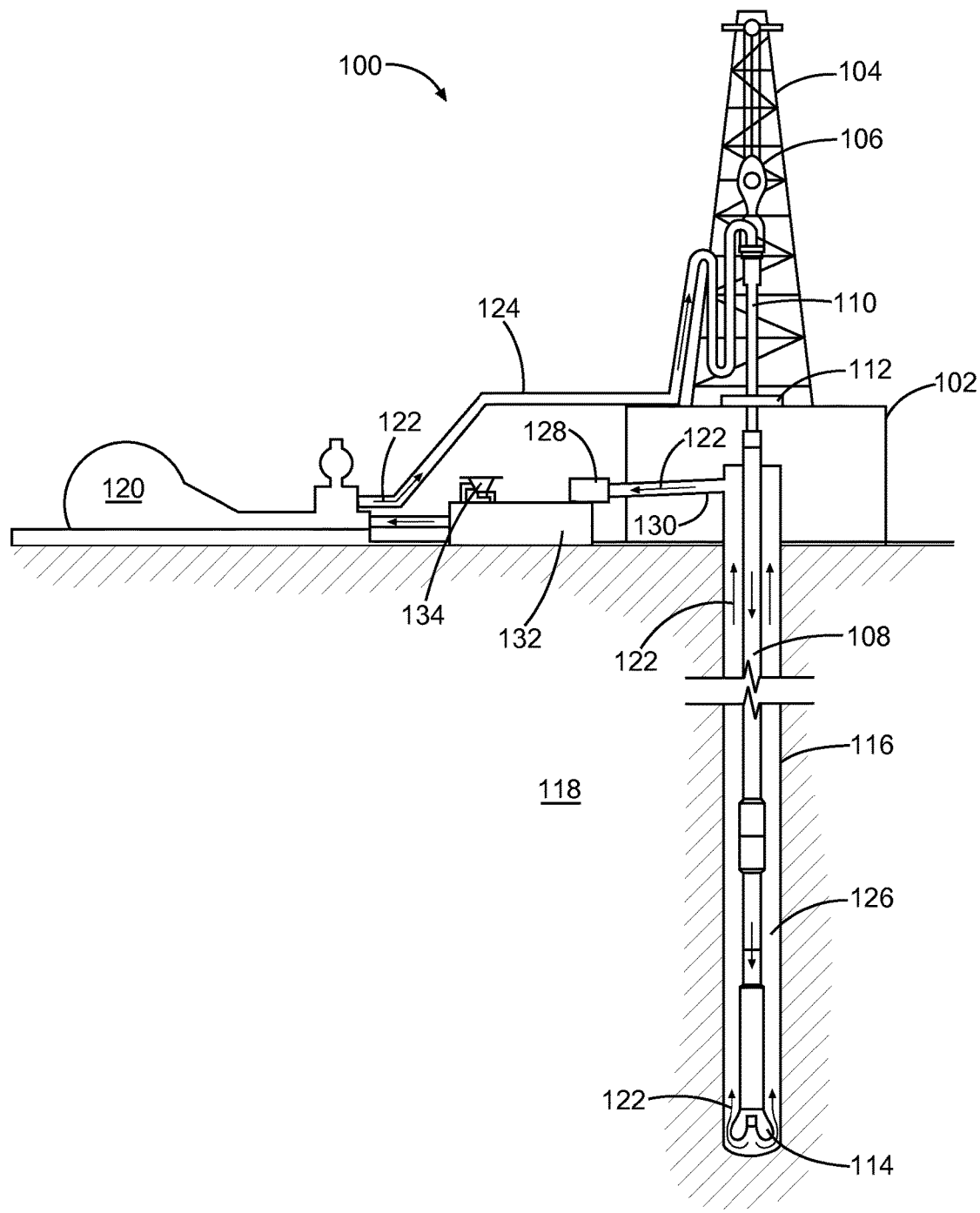
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

As used herein, a "shale stabilizer" is a material that slows or prevents the mechanical or chemical disaggregation of shale.

As used herein, a "clay stabilizer" is a material that slows or prevents the mechanical or chemical disaggregation of clay.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) at least one of interrupted with 0, 1, 2, or 3 groups independently substituted from —O—, substituted or unsubstituted —NH—, and —S—, a poly (substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes obtaining or providing a composition including a polymeric clay stabilizer. The polymeric clay stabilizer includes at least one ionic repeating unit. The clay stabilizer has a melting point or glass transition temperature that is equal to or less than 100° C. The method includes placing the composition in a subterranean formation.

In various embodiments, the present invention provides a method of treating a subterranean formation. The method includes obtaining or providing a drilling fluid, fracturing fluid, or cementing fluid including about 0.001 wt % to about 10 wt % of a polymeric clay stabilizer. The polymeric clay stabilizer includes at least one ionic repeating unit that is about 50 mol % to 100 mol % of the total repeating units in the clay stabilizer. The clay stabilizer has a melting point or glass transition temperature that is equal to or less than 30° C. The ionic repeating unit has the structure:

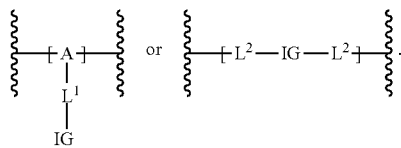

The variable A is selected from the group consisting of a substituted or unsubstituted($C_2$-$C_{20}$)hydrocarbylene interrupted or terminated by 0, 1, 2, or 3 atoms selected from at least one of —O—, —S—, and substituted or unsubstituted —NH—, a substituted or unsubstituted ($C_1$-$C_{10}$)heterocycle including at least one O, N, or S atom, and a substituted or unsubstituted siloxane or polysiloxane. The variables $L^1$ and $L^2$ are each independently selected from the group consisting of a bond, a poly(oxy(substituted or unsubstituted($C_2$-$C_{20}$)hydrocarbylene)), a substituted or unsubstituted siloxane or polysiloxane, and a substituted or unsubstituted($C_1$-$C_{20}$)hydrocarbylene interrupted or terminated by 0, 1, 2, or 3 atoms selected from at least one of —O—, —S—, a substituted or unsubstituted —NH—, and a substituted or unsubstituted —BH—. The variable IG is a substituted or unsubstituted ionic group charge balanced by a counterion. The method also includes placing the drilling fluid, fracturing fluid, or cementing fluid in a subterranean formation.

In various embodiments, the present invention provides a system including a polymeric clay stabilizer. The polymeric clay stabilizer includes at least one ionic repeating unit. The clay stabilizer has a melting point or glass transition temperature that is equal to or less than 100° C. The system also includes a subterranean formation including the composition therein.

In various embodiments, the present invention provides a composition for treatment of a subterranean formation. The composition includes a polymeric clay stabilizer. The polymeric clay stabilizer includes at least one ionic repeating unit. The clay stabilizer has a melting point or glass transition temperature that is equal to or less than 100° C.

In various embodiments, the present invention provides a drilling fluid, a fracturing fluid, or a cementing fluid for treatment of a subterranean formation. The composition includes about 0.001 wt % to about 10 wt % of a polymeric clay stabilizer. The polymeric clay stabilizer includes at least one ionic repeating unit that is about 50 mol % to 100 mol % of the total repeating units in the clay stabilizer. The clay stabilizer has a melting point or glass transition temperature that is equal to or less than 30° C. The ionic repeating unit has the structure:

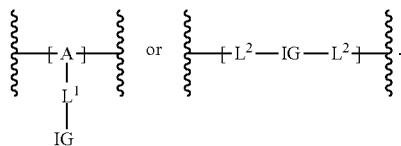

The variable A is selected from the group consisting of a substituted or unsubstituted($C_2$-$C_{20}$)hydrocarbylene interrupted or terminated by 0, 1, 2, or 3 atoms selected from at least one of —O—, —S—, and substituted or unsubstituted —NH—, a substituted or unsubstituted ($C_1$-$C_{10}$)heterocycle including at least one O, N, or S atom, and a substituted or unsubstituted siloxane or polysiloxane. The variables $L^1$ and $L^2$ are each independently selected from the group consisting of a bond, a poly(oxy(substituted or unsubstituted($C_2$-

$C_{20}$)hydrocarbylene)), a substituted or unsubstituted siloxane or polysiloxane, and a substituted or unsubstituted($C_1$-$C_{20}$)hydrocarbylene interrupted or terminated by 0, 1, 2, or 3 atoms selected from at least one of —O—, —S—, a substituted or unsubstituted —NH—, and a substituted or unsubstituted —BH—. The variable IG is a substituted or unsubstituted ionic group charge balanced by a counterion.

In various embodiments, the present invention provides a method of preparing a composition for treatment of a subterranean formation. The method includes forming a composition that includes a polymeric clay stabilizer. The polymeric clay stabilizer includes at least one ionic repeating unit. The clay stabilizer has a melting point or glass transition temperature that is equal to or less than 100° C.

Various embodiments of the present invention provide certain advantages over other methods, composition, and systems for clay stabilization. In various embodiments, the clay stabilizer can stabilize or inhibit clay or shale disaggregation more effectively than other clay or shale inhibitors. In various embodiments, the amount of clay stabilizer needed can be less costly to effect a given amount of stabilization of clay or shale than the amount of another clay or shale inhibitor needed to effect the same amount of stabilization. In some embodiments, the clay stabilizer can have a higher charger density than other clay inhibitors, allowing it to provide superior clay stabilization due to better adhesion between the clay and the clay stabilizer. In various embodiments, the polymeric clay stabilizer can be tuned structurally (e.g., hydrophobicity, hydrophilicity, molecular weight) to provide a solubility in a desired solvent system or in a desired set of conditions. In various embodiments, the clay stabilizer can provide catalyzation for breaking gels (e.g., de-polymerization or de-crosslinking via hydrolysis), such that a separate step of applying a breaker can be avoided or minimized. In some embodiments, unlike other clay inhibitors, the clay stabilizer can be readily biodegradable. In some embodiments, the clay stabilizer can have less or no toxicity as compared to other clay or shale inhibitors.

Method of Treating a Subterranean Formation.

In some embodiments, the present invention provides a method of treating a subterranean formation. The method includes obtaining or providing a composition including a polymeric clay stabilizer comprising at least one ionic repeating unit. The composition can include one or more of the polymeric clay stabilizers. The obtaining or providing of the composition can occur at any suitable time and at any suitable location. The obtaining or providing of the composition can occur above the surface. The obtaining or providing of the composition can occur in the subterranean formation (e.g., downhole). The method also includes placing the composition in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation.

In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include using the composition as a drilling fluid or as a cementing fluid.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

In some embodiments, the method can be a method of drilling, stimulation, fracturing, spotting, clean-up, completion, remedial treatment, applying a pill, acidizing, cementing, or a combination thereof, wherein the composition can be or can include a drilling fluid, stimulation fluid, a fracturing fluid, a spotting fluid, a clean-up fluid, a completion fluid, a remedial treatment fluid, a pill, an acidization fluid, a cementing fluid, respectively.

In some embodiments, the composition can include carrier fluid. The carrier fluid can be any suitable fluid or combination of fluids, such as an aqueous fluid, an organic fluid, or an oil. The carrier fluid can be any suitable proportion of the composition, such as about 0.0001 wt % to 99.9999 wt % of the composition, or about 0.01 wt % to about 99.99 wt %, about 0.1 wt % to about 99.9 wt %, or about 20 wt % to about 90 wt %, about 50 wt % to about 99.999 wt %, or about 0.0001 wt % or less, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999 wt %, or about 99.999.9 wt % or more of the composition can be the carrier fluid.

In some embodiments, the composition can include an aqueous liquid. The aqueous liquid can be any suitable aqueous liquid, such as at least one of water, brine, produced water, flowback water, brackish water, and sea water. In some embodiments, the aqueous liquid can include at least one of an aqueous drilling fluid, aqueous fracturing fluid, aqueous diverting fluid, and an aqueous fluid loss control fluid. In some embodiments, the aqueous liquid can be the aqueous phase of an emulsion (e.g., the composition can include an emulsion having as the aqueous phase the aqueous liquid). The aqueous liquid can be any suitable proportion of the composition, such that the composition can be used as described herein. For example, about 0.000.1 wt % to 99.999.9 wt % of the composition can be the aqueous liquid, or about 0.01 wt % to about 99.99 wt %, about 0.1 wt % to about 99.9 wt %, or about 20 wt % to about 90 wt %, or about 0.000.1 wt % or less, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999 wt %, or about 99.999.9 wt % or more of the composition can be the aqueous liquid.

The aqueous liquid can be a salt water. The salt can be any suitable salt, such as at least one of NaBr, $CaCl_2$, $CaBr_2$, $ZnBr_2$, KCl, NaCl, a magnesium salt, a bromide salt, a formate salt, an acetate salt, and a nitrate salt. The aqueous liquid can have any suitable total dissolved solids level (e.g., wherein the dissolved solids correspond to dissolved salts), such as about 1,000 Mg/L to about 250,000 Mg/L, or about 1,000 Mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 Mg/L or more. The aqueous liquid can have any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250, 000, 275,000, or about 300,000 ppm or more. In some examples, the aqueous liquid can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more.

The composition can be oil-based (e.g., over 50 wt % oil or organic fluids) or water-based (e.g., over 50 wt % aqueous fluids). In some embodiments, the composition can be an emulsion. The emulsion can be an aqueous-external emulsion or an oil-external emulsion. The clay stabilizer can be at least partially dissolved in the water-phase of an emulsion, at least partially dissolved in an oil-phase of an emulsion, or a combination thereof.

Clay Stabilizer.

The composition can include one clay stabilizer, or more than one clay stabilizer. The clay stabilizer can be a shale stabilizer. Any suitable proportion of the composition can be the clay stabilizer, such as about 0.000.1 wt % to 99.999.9 wt % of the composition, or about 0.01 wt % to about 99.99 wt %, about 0.001 wt % to about 99.9 wt %, or about 0.001 wt % to about 10 wt %, or about 0.000.1 wt % or less, or about 0.000.001 wt %, 0.000.1, 0.001, 0.01, 0.1, 1, 2, 3, 4, 5, 6, 7, 8, 9, 10, 15, 20, 30, 40, 50, 60, 70, 80, 85, 90, 91, 92, 93, 94, 95, 96, 97, 98, 99, 99.9, 99.99, 99.999 wt %, or about 99.999.9 wt % or more of the composition. In various embodiments, the solubility of the clay stabilizer can be tuned, such as by using hydrophobic substituents to enhance oil or organic solubility, or by using hydrophilic groups to enhance water solubility. In various embodiments, the clay stabilizer can operate in any suitable way, such as by substituting for other ions (e.g., cations) in a clay lattice which make it more prone to swelling. In some embodiments, the polymeric clay stabilizer can be a shale stabilizer.

Any suitable type of clay can be stabilized by the clay stabilizer. For example, clays of the montmorillonite (smectite) group such as montmorillonite, saponite, nontronite, hectorite, and sauconite; the kaolin group such as kaolinite, nacrite, dickite, and halloysite; the hydrousmica group such as hydrobiotite, glauconite, illite and bramallite; the chlorite group such as chlorite and chamosite; clay minerals not belonging to the above groups such as vermiculite, attapulgite, and sepiolite, and mixed-layer varieties of the such minerals and groups. Other mineral components may further be associated with the clay.

The polymeric clay stabilizer can be any suitable type of polymer. The polymeric clay stabilizer can be a homopolymer, having only the ionic repeating units. The polymeric clay stabilizer can be a copolymer, having multiple types of ionic repeating units, or having one or more ionic repeating units in combination with one or more non-ionic repeating units. The repeating units in a copolymeric clay stabilizer can be in block, alternate, or random arrangement with respect to one another. The one or more ionic repeating units can form any suitable proportion of the total number of repeating units in the polymeric clay stabilizer, such as about 0.01 mol % to about 100 mol % of the total repeating units, about 50 mol % to 100 mol %, or about 0.01 mol % or less, or about 0.1 mol %, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or about 99.99 mol % or more. Examples of non-ionic repeating groups (e.g., that can be included in a copolymer) can include those derived from polymerization of vinyl alcohol, a substituted or unsubstitued ($C_2$-$C_{50}$)hydrocarbyl having at least one aliphatic unsaturated C—C bond therein, and a substituted or unsubstituted ($C_2$-$C_{50}$)alkene. Examples of non-ionic repeating groups can include those derived from polymerization of vinyl phosphonic acid, vinylidene diphosphonic acid, substituted or unsubstituted 2-acrylamido-2-methylpropanesulfonic acid, a substituted or unsubstituted ($C_1$-$C_{20}$) alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, or a substituted or unsubstituted ($C_1$-$C_{20}$)alkyl ester thereof. Examples of non-ionic repeating groups can include those derived from polymerization of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$) alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, or an N—($C_1$-$C_{10}$)alkenyl nitrogen containing substituted or unsubstituted ($C_1$-$C_{10}$)heterocycle.

The polymeric clay stabilizer can be formed in any suitable way. For example, the polymeric clay stabilizer can be formed by free-radical polymerization, controlled/living radical polymerization, atom transfer radical polymerization, reversible addition-fragmentation chain transfer polymerization, hydroboration polymerization, ring opening metathesis polymerization, oxidative polymerization, condensation polymerization. The polymerized ionic repeating units can be in ionic form prior to the polymerization, or the ionic repeating units can be formed from non-ionic polymerized units (e.g., forming a polymer including ammonia, imidazole, or pyridine groups, and subsequently ionizing those groups).

The clay stabilizer can have any suitable melting point, such that it can be used as described herein. The melting point corresponds to a temperature at which the polymeric clay stabilizer undergoes a transition from solid to a liquid or vice versa. In some examples, the clay stabilizer can have a melting point of less than 100° C., or less than 90° C., 80, 70, 60, 50, 40, 35, 30, 25, 20, 10, or less than 0° C. In various embodiments, the melting point of the clay stabilizer can be about −250° C. to about 100° C., −200° C. to about 50° C.,−100° C. to about 30° C., or about −250° C. or less, or about −200° C.,−175, −150, −125, −100, −90, −80, −70, −60, −50, −40, −30, −20, −10, 0, 10, 20, 30, 40, 50, 60, 70, 80, 90, or about 100° C. or more.

The clay stabilizer can have any suitable glass transition temperature, such that it can be used as described herein. The glass transition temperature corresponds to a temperature at which the clay stabilizer undergoes a reversible transition from a hard and relatively brittle state into a molten or rubber-like state or vice versa. The glass transition temperature can be measured in any suitable way, such as via differential scanning calorimetry. In some embodiments, the clay stabilizer has a glass transition temperature of less than 100° C., or less than 90° C., 80, 70, 60, 50, 40, 35, 30, 25, 20, 10, or less than 0° C. In various embodiments, the glass transition temperature of the clay stabilizer can be about −250° C. to about 100° C., −200° C. to about 50° C., −100° C. to about 30° C., or about −250° C. or less, or about −200° C., −175, −150, −125, −100, −90, −80, −70, −60, −50, −40, −30, −20, −10, 0, 10, 20, 30, 40, 50, 60, 70, 80, 90, or about 100° C. or more.

The ionic repeating group can be any suitable ionic repeating group, such that the method can be carried out as described herein. In various embodiments, the ionic repeating unit has the structure:

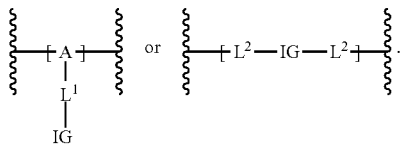

The variable A can be selected from the group consisting of a substituted or unsubstituted($C_2$-$C_{20}$)hydrocarbylene interrupted or terminated by 0, 1, 2, or 3 atoms selected from at least one of —O—, —S—, and substituted or unsubstituted —NH—, a substituted or unsubstituted ($C_1$-$C_{10}$)heterocycle including at least one O, N, or S atom, and a substituted or unsubstituted siloxane or polysiloxane. The variables $L^1$ and $L^2$ can be each independently selected from the group consisting of a bond, a poly(oxy(substituted or unsubstituted ($C_2$-$C_{20}$)hydrocarbylene)), a substituted or unsubstituted siloxane or polysiloxane, and a substituted or unsubstituted ($C_1$-$C_{20}$)hydrocarbylene interrupted or terminated by 0, 1, 2, or 3 atoms selected from at least one of —O—, —S—, a substituted or unsubstituted —NH—, and a substituted or unsubstituted —BH—. The variable IG can be a substituted or unsubstituted ionic group charge balanced by a counterion.

The variable A can be selected from the group consisting of a substituted or unsubstituted($C_2$-$C_{20}$)hydrocarbylene interrupted or terminated by 0, 1, 2, or 3 atoms selected from at least one of —O—, —S—, and substituted or unsubstituted —NH—, a substituted or unsubstituted ($C_1$-$C_{10}$)heterocycle including at least one O, N, or S atom, and a substituted or unsubstituted siloxane or polysiloxane. The variable A can be selected from the group consisting of a substituted or unsubstituted($C_2$-$C_{20}$)alkylene, a substituted or unsubstituted pyrrole, a substituted or unsubstituted thiophene, and a substituted or unsubstituted siloxane or polysiloxane. The variable A can be selected from the group consisting of a mono-($C_1$-$C_5$)alkyl-substituted ($C_2$-$C_{20}$) alkylene, a pyrrole, a thiophene, and a ($C_1$-$C_5$)alkyl-substituted siloxane or polysiloxane.

In some embodiments, the variable A can be selected from the group consisting of:

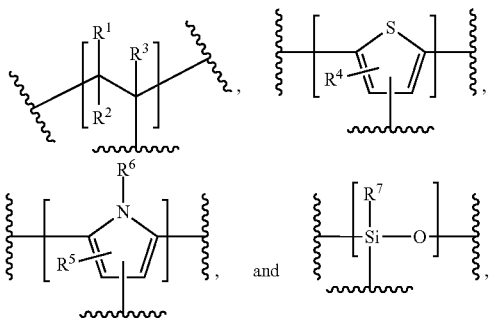

The variables $R^1$, $R^2$, $R^3$, $R^4$, $R^5$, $R^6$, and $R^7$ can be each independently selected from the group consisting of —H, halide, and substituted or unsubstituted ($C_1$-$C_{20}$)hydrocarbyl interrupted by 0, 1, 2, or 3 atoms selected from —O—, —S—, and substituted or unsubstituted —NH. The variables $R^1$, $R^2$, $R^3$, $R^4$, $R^5$, $R^6$, and $R^7$ can be each independently selected from the group consisting of —H, substituted or unsubstituted ($C_1$-$C_{20}$)alkyl, and substituted or unsubstituted ($C_1$-$C_{20}$)alkoxy. The variables $R^1$, $R^2$, $R^3$, $R^4$, $R^5$, $R^6$, and $R^7$ can be each independently selected from the group consisting of —H, ($C_1$-$C_5$)alkyl, and ($C_1$-$C_5$)alkoxy. The variables $R^1$, $R^2$, $R^3$, $R^4$, $R^5$, $R^6$, and $R^7$ can be each independently selected from the group consisting of —H, methyl, and methoxy.

The variables $L^1$ and $L^2$ can be each independently selected from the group consisting of a bond, a poly(oxy (substituted or unsubstituted($C_2$-$C_{20}$)hydrocarbylene)), a substituted or unsubstituted siloxane or polysiloxane, and a substituted or unsubstituted($C_1$-$C_{20}$)hydrocarbylene interrupted or terminated by 0, 1, 2, or 3 atoms selected from at least one of —O—, —S—, a substituted or unsubstituted —NH—, and a substituted or unsubstituted —BH—. The variables $L^1$ and $L^2$ can be each independently selected from the group consisting of a bond, a poly(oxy(substituted or unsubstituted($C_2$-$C_{20}$)alkylene)), a substituted or unsubstituted siloxane or polysiloxane, and a substituted or unsubstituted($C_1$-$C_{20}$)alkylene interrupted or terminated by 0, 1, 2, or 3 atoms selected from at least one of —O—, —S—, a substituted or unsubstituted —NH—, and a substituted or unsubstituted —BH—, wherein $L^1$ and $L^2$ each independently include 0 or 1 bonds to an ionic group or to $L^1$ or $L^2$ of the same or a different polymer molecule. The variables $L^1$ and $L^2$ are each independently selected from the group consisting of a bond, a poly(oxyethylene)), a ($C_1$-$C_5$)alkyl-substituted siloxane or polysiloxane, and a ($C_1$-$C_{10}$)alkylene interrupted or terminated by 0, 1, 2, or 3 atoms selected from at least one of —O— and a substituted or unsubstituted —NH—, and a substituted or unsubstituted —BH—. The variable L¹ can be selected from the group consisting of —C(O)O-L³-, C(O)NH-L³-, and -Ph-L³-. The variable L³ can be selected from the group consisting of a bond and a ($C_1$-$C_{10}$)alkylene interrupted or terminated by 0, 1, 2, or 3 atoms selected from at least one of —O— and a substituted or unsubstituted —NH—. The variable L³ can be selected from the group consisting of a bond and a ($C_1$-$C_{10}$)alkylene. The variable L² can be independently a substituted or unsubstituted($C_1$-$C_{20}$)alkylene interrupted or terminated by 0, 1, 2, or 3 atoms selected from at least one of —O—, —S—, a substituted or unsubstituted —NH—, and a substituted or unsubstituted —BH—. At each occurrence the variable L² can be independently a ($C_1$-$C_{10}$)alkylene terminated by 0 or 1 ($C_1$-$C_{20}$)hydrocarbyl- or ($C_1$-$C_{20}$)hydrocarbyloxy-substituted boron atoms.

The variable IG can be a substituted or unsubstituted ionic group charge balanced by a counterion. The charge balancing can be an ionic bond between the ionic group and the counterion. The ionic group can be charge balanced by one counterion or multiple counterions. A counterion can charge balance one ionic group or multiple ionic groups (e.g., a counterion can have a charge of less than −1 or greater than +1). The ionic group of IG can be any suitable ionic group, such that the method can be carried out as described herein. The ionic group of IG can be selected from the group consisting of a substituted or unsubstituted ($C_1$-$C_{10}$)heterocycle cation or anion including at least one N or S atom, a substituted or unsubstituted ammonium, a substituted or unsubstituted sulfonium, a substituted or unsubstituted phosphonium, a carboxylate, a sulfonate, a phosphonate, and a substituted or unsubstituted guanidinium, wherein the ionic group includes 0 or 1 bonds to another ionic group or to L¹ or L² of the same or a different polymer molecule. The ionic group of IG can be selected from the group consisting of a substituted or unsubstituted imidazolium, a substituted or unsubstituted pyridinium, a substituted or unsubstituted pyrrolidinium, a substituted or unsubstituted ammonium, a substituted or unsubstituted phosphonium, a carboxylate, a sulfonate, a phosphonate, and a substituted or unsubstituted guanidinium, wherein the ionic group includes 0 or 1 bonds to another ionic group or to L¹ or L² of the same or a different polymer molecule. The ionic group of IG can include at least one of a hydrogen halide salt, a substituted or unsubstituted ($C_1$-$C_{50}$)hydrocarbylcarboxylic acid salt, a substituted or unsubstituted ($C_1$-$C_{50}$)hydrocarbylsulfonic acid salt, a substituted or unsubstituted ($C_1$-$C_{50}$)hydrocarbylphosphonic acid salt.

In various embodiments, IG can be selected from the group consisting of —$SO_3^-Y^+$, —$PO_3^-Y^+$, —$COO^-Y^+$,

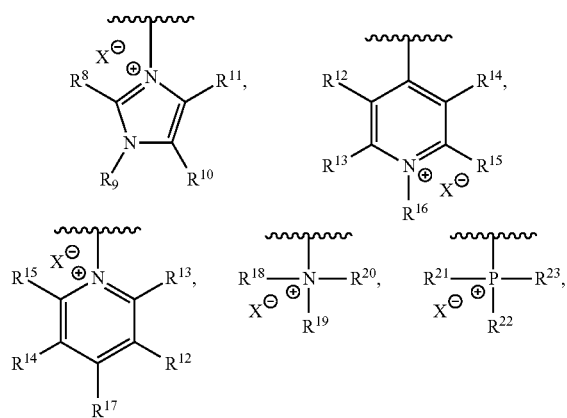

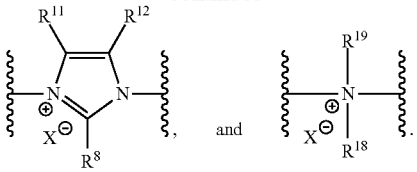

The variables $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ can each independently be selected from the group consisting of —H, halide, and substituted or unsubstituted ($C_1$-$C_{20}$)hydrocarbyl interrupted by 0, 1, 2, or 3 atoms selected from —O—, —S—, and substituted or unsubstituted —NH. The variable $X^-$ or $Y^+$ is the counterion. The variables $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ can each be independently selected from the group consisting of —H, substituted or unsubstituted ($C_1$-$C_{20}$)alkyl, and substituted or unsubstituted ($C_1$-$C_{20}$)alkoxy. The variables $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ can each be independently selected from the group consisting of —H, ($C_1$-$C_5$)alkyl, and ($C_1$-$C_5$)alkoxy. The variables $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ can each be independently selected from the group consisting of —H, methyl, methoxy, ethyl, ethoxy, propyl, propoxy, butyl, and butoxy.

The counterion of the ionic group can be any suitable counterion, such that the method can be carried out as described herein. In various embodiments, the counterion of the ionic group can be selected from the group consisting of a substituted or unsubstituted cationic ($C_1$-$C_{10}$)heterocycle, a substituted or unsubstituted ammonium, a substituted or unsubstituted phosphonium, a substituted or unsubstittued sulfonium, a substituted or unsubstituted guanidinium, $Na^+$, $K^+$, $Li^+$, $H^+$, $NH_4^+$, $Ca^{2+}$, $Mg^{2+}$, $Zn^{2+}$, and $Al^{3+}$. The counterion of the ionic group can be selected from the group consisting of a substituted or unsubstituted imidazolium, a substituted or unsubstituted pyridinium, a substituted or unsubstituted pyrrolidinium, $N(R^{24})_4^+$, $P(R^{25})_4^+$, and $S(R^{26})_3^+$, wherein at each occurrence each of $R^{24}$, $R^{25}$, and $R^{26}$ is selected from the group consisting of —H, poly(oxy (substituted or unsubstituted ethyl)), and a substituted or unsubstituted($C_1$-$C_{20}$)hydrocarbylene interrupted or terminated by 0, 1, 2, or 3 atoms selected from at least one of —O—, —S—, and a substituted or unsubstituted —NH—. The counterion of the ionic group can be a mono or di ($C_1$-$C_{10}$)alkyl-substituted imidazolium, wherein each ($C_1$-$C_{10}$)alkyl is independently selected. The counterion of the ionic group can be an imidazolium bound via the 1-position and substituted at the 3-position with a group selected from methyl, ethyl, propyl, butyl, pentyl, hexyl, heptyl, octyl, nonyl, and decyl.

In various embodiments, the counterion of the ionic group is selected from the group consisting of $PF_6^-$, $(CF_3SO_2)_2N^-$, $B(R^{27})_4^-$, $NO_3^-$, $Cl^-$, $Br^-$, $I^-$, $F^-$, $CF_3CO_2^-$, $AsF_6^-$, $SbF_6^-$, $NO_2^-$, $SO_4^{2-}$, perchlorate ($Cl_4O^-$), thiocyanate, cyanate, a substituted or unsubstituted ($C_1$-$C_{50}$)hydrocarbylcarboxylate, a substituted or unsubstituted ($C_1$-$C_{50}$)hydrocarbylsulfonate, a substituted or unsubstituted ($C_1$-$C_{50}$)hydrocarbylsulfate, a substituted or unsubstituted ($C_1$-$C_{50}$)hydrocarbylphosphonate, substituted or unsubstituted ($C_1$-$C_{50}$)hydrocarbylphosphate, wherein at each occurrence $R^{27}$ is selected from the group consisting of —H, halo, poly(oxy (substituted or unsubstituted ethyl)), and a substituted or unsubstituted($C_1$-$C_{20}$)hydrocarbylene interrupted or terminated by 0, 1, 2, or 3 atoms selected from at least one of —O—, —S—, and a substituted or unsubstituted —NH—. The counterion of the ionic group can be selected from the group consisting of acetate, formate, fluoro, chloro, iodo, bromo, be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, oxide, sulfide, nitride, arsenate, phosphate, arsenite, hydrogen phosphate, sulfate, thiosulfate, sulfite, carbonate, chromate, dichromate, peroxide, oxalate, methanesulfonate.

In some embodiments, the polymeric clay stabilizer can be hydrophobic and can include a counterion such as $PF_6^-$, $(CF_3SO_2)_2N^-$, or $B(R^{27})_4^-$. In some embodiments, the polymeric clay stabilizer can be hydrophilic and can include a counterion such as $NO_3^-$, $Cl^-$, $Br^-$, $I^-$, $CF_3CO_2^-$, or $CH_3CO_2^-$.

In various embodiments, the ionic repeating group has the structure:

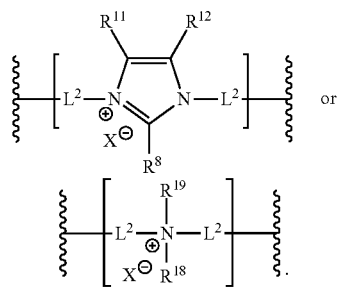

The variables $R^8$, $R^{11}$, $R^{12}$, $R^{18}$, and $R^{19}$ can each be independently selected from the group consisting of —H, substituted or unsubstituted $(C_1-C_{20})$alkyl, and substituted or unsubstituted $(C_1-C_{20})$alkoxy. The variable $X^-$ is the counterion.

In various embodiments, the ionic repeating group can have a structure selected from the group consisting of:

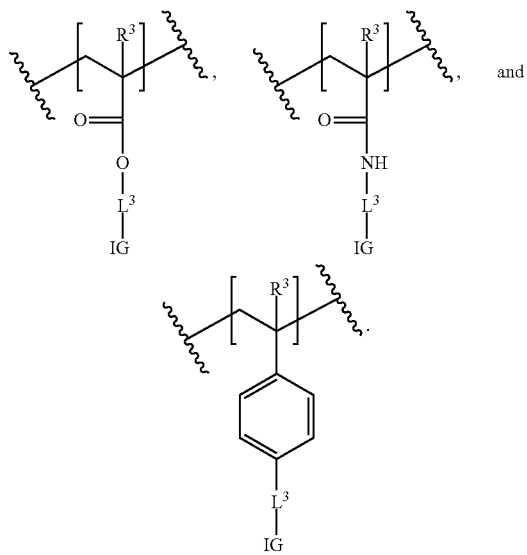

The variable $L^3$ can be selected from the group consisting of a bond and a $(C_1-C_{10})$alkylene interrupted or terminated by 0, 1, 2, or 3 atoms selected from at least one of —O— and a substituted or unsubstituted —NH—.

In various embodiments, the ionic repeating unit can be formed by polymerizing a polymerizable molecule selected from an acrylamide($C_1-C_{10}$)hydrocarbylsulfonic acid, 2-acrylamido-2-methylpropane sulfonic acid (AMPS), a substituted or unsubstituted a vinylimidazolium (e.g., a substituted or unsubstituted N-vinylimidazolium), an ionic-group substituted styrene, an ionic-group substituted methacryloyl, a substituted or unsubstituted vinylpyridinium (e.g., a substituted or unsubstited N-vinylpyridinium).

In various embodiments, at least one of the A, $L^1$, $L^2$, IG, and the counterion includes at least one acidic substituent selected from the group consisting of a carboxylic acid, a sulfonic acid, and a phosphonic acid.

The polymeric clay stabilizer can have any suitable degree of polymerization, such as about 2 to about 10,000,000, about 50 to about 500,000, or about 2, 3, 4, 5, 6, 7, 8, 9, 10, 12, 14, 16, 18, 20, 25, 30, 35, 40, 45, 50, 60, 70, 80, 90, 100, 125, 150, 175, 200, 250, 500, 750, 1,000, 1,250, 1,500, 1,750, 2,000, 2,500, 5,000, 7,500, 10,000, 15,000, 20,000, 25,000, 50,000, 100,000, 200,000, 500,000, 750,000, 1,000,000, 2,500,000, 5,000,000, or about 10,000,000 or more. The clay stabilizer can have any suitable molecular weight, such as about 50 to about 10,000,000, about 500 to about 500,000, or about 50 or less, or about 75, 100, 150, 200, 250, 500, 750, 1,000, 1,250, 1,500, 1,750, 2,000, 2,500, 5,000, 7,500, 10,000, 15,000, 20,000, 25,000, 50,000, 100,000, 200,000, 500,000, 750,000, 1,000,000, 2,500,000, 5,000,000, or about 10,000,000 or more. In various embodiments, ultra-low molecular weight polymeric clay stabilizers (e.g., having molecular weight less than 10,000, 5,000, 2,500, 1,000, or less than 500) can be used to stabilize water sensitive shales.

Other Components.

The composition including the clay stabilizer, or a mixture including the composition, can include any suitable additional component in any suitable proportion, such that the composition, or mixture including the same, can be used as described herein.

In some embodiments, the composition includes one or more second clay stabilizers. The second clay stabilizer can be any suitable clay stabilizer. In various embodiments, the second clay stabilizer can be potassium chloride, a non-polymeric ionic liquid (e.g., including a substituted imidazolium ion or a substituted quaternary ammonium ion, such as 1-ethyl-3-methylimidazolium chloride, tris-(2-hydroxyethyl)-methylammonium methylsulfate, methyl tri-n-butyl ammonium methylsulfate, 1-ethyl-3-methylimidazolium methanesulfonate, 1-butyl-3-methylimidazolium chloride, 1-butyl-3-methylimidazolium methanesulfonate, 1-ethyl-2, 3-di-methylimidazolium ethylsulfate, and 1,2,3-trimethylimidazolium methylsulfate), an inorganic phosphate (e.g., as described in U.S. Pat. No. 4,605,068), a polyalkoxy diamine or a salt thereof (e.g., as described in U.S. Pat. Nos. 6,484,821, 6,609,578, 6,247,543; and U.S. Patent Publication No. 20030106718), choline or a choline derivative (e.g., as described in U.S. Pat. No. 5,908,814), an oligomethylene diamine or a salt thereof (e.g., as described in U.S. Pat. No. 5,771,971 and U.S. Patent Publication No. 20020155956), an addition product of carboxymethyl cellulose and an organic amine (e.g., as described in WO 2006/013595), 1,2-cyclohexanediamine or a salt thereof (e.g., as described in WO 2006/013597), a salt of a phosphoric acid ester of an oxyalkylated polyol (e.g., as described in WO 2006/013597), a combination of a partially hydrolyzed acrylic copolymer potassium chloride and polyanionic cellulose (e.g., as described in U.S. Pat. No. 4,664,818), a quaternary ammonium compound (e.g., as described in U.S. Pat. Nos.

5,197,544 and 5,380,706), a polymer based on dialkyl aminoalkyl methacrylate (e.g., as described in U.S. Pat. No. 7,091,159), an aqueous solution containing a polymer with hydrophilic and hydrophobic groups (e.g., as described in U.S. Pat. No. 5,728,653), and a reaction product of a polyhydroxyalkane and an alkylene oxide (e.g., as described in U.S. Pat. No. 6,544,933). In some embodiments, the second clay stabilizer can be about 0.000.1 wt % to about 50 wt % of the composition, about 0.000.1 wt % to about 10 wt %, about 0.004 wt % to about 0.01 wt % of the composition, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the composition.

In some embodiments, the composition includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000.1 wt % to about 10 wt % of the composition, about 0.004 wt % to about 0.01 wt % of the composition, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the composition.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly($(C_2$-$C_{10})$alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstitued ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly(($(C_1-C_{20})$alkenyl)-substituted mono- or poly-$(C_1-C_{20})$alkyl ether (e.g., pentaerythritol allyl ether), and a poly($C_2-C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the composition, about 0.001 wt % to about 0.01 wt %, or about 0.000.01 wt % or less, or about 0.000.05 wt %, 0.0001, 0.0005, 0.001, 0.005, 0.01, 0.05, 0.1, 0.5, 1, 2, 3, 4, or about 5 wt % or more.

In some embodiments, the composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2-C_{40}$ fatty acid $C_1-C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the clay stabilizer can include any suitable downhole fluid. The composition including the clay stabilizer can be combined with any suitable downhole fluid before, during, or after the placement of the composition in the subterranean formation or the contacting of the composition and the subterranean material. In some examples, the composition including the clay stabilizer is combined with a downhole fluid above the surface, and then the combined composition is placed in a subterranean formation or contacted with a subterranean material. In another example, the composition including the clay stabilizer is injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used in the subterranean formation (e.g., downhole), at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

In various embodiments, the composition including the clay stabilizer, or a mixture including the same, can include any suitable downhole fluid, such as an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition or a mixture including the same can include one or more additive components such as: X-TEND® II, PAC™-R, PAC™-L, LIQUI-VIS® EP, BRINEDRIL-VIS™, BARAZAN®, N-VIS®, and AQUA-GEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BARO-FIBRE™, STEELSEAL®, and HYDRO-PLUG® lost circulation management materials. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the composition including the clay stabilizer in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more of the mixture.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including the clay stabilizer can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

The composition can include a payload material. The payload can be deposited in any suitable subterranean location. The method can include using the composition to deposit a payload material into a subterranean fracture. The subterranean fracture can be any suitable subterranean fracture. In some embodiments, the method includes forming the subterranean fracture; in other embodiments, the subterranean fracture is already formed. The payload material can be a proppant, or any other suitable payload material, such as a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a corrosion inhibitor, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, an acidity control agent, a density control agent, a density modifier, an emulsifier, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Drilling Assembly.

In various embodiments, the composition including the clay stabilizer disclosed herein can directly or indirectly affect one or more components or pieces of equipment associated with the preparation, delivery, recapture, recycling, reuse, and/or disposal of the disclosed composition including the clay stabilizer. For example, and with reference to FIG. 1, the disclosed composition including the clay stabilizer can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The composition including the clay stabilizer can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the composition including the clay stabilizer can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the composition including the clay stabilizer can be stored, reconditioned, and/or regulated until added to the drilling fluid 122.

As mentioned above, the composition including the clay stabilizer can directly or indirectly affect the components and equipment of the drilling assembly 100. For example, the composition including the clay stabilizer can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the composition including the clay stabilizer.

The composition including the clay stabilizer can directly or indirectly affect the pump 120, which representatively includes any conduits, pipelines, trucks, tubulars, and/or pipes used to fluidically convey the composition including the clay stabilizer to the subterranean formation, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition including the clay stabilizer can also directly or indirectly affect the mixing hopper 134 and the retention pit 132 and their assorted variations.

The composition including the clay stabilizer can also directly or indirectly affect the various downhole or subterranean equipment and tools that can come into contact with the composition including the clay stabilizer such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition including the clay stabilizer can also directly or indirectly affect any downhole heat exchangers, valves and corresponding actuation devices, tool seals, packers and other wellbore isolation devices or components, and the like associated with the wellbore 116. The composition including the clay stabilizer can also directly or indirectly affect the drill bit 114, which can include roller cone bits, polycrystalline diamond compact (PDC) bits, natural diamond bits, any hole openers, reamers, coring bits, and the like.

While not specifically illustrated herein, the composition including the clay stabilizer can also directly or indirectly affect any transport or delivery equipment used to convey the composition including the clay stabilizer to the drilling assembly 100 such as, for example, any transport vessels, conduits, pipelines, trucks, tubulars, and/or pipes used to fluidically move the composition including the clay stabilizer from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including the clay stabilizer. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a drilling operation, a fracturing operation (e.g., pre-pad, pad, slurry, or finishing stages), or a cementing operation. In various embodiments, the system or apparatus can include a pump fluidly coupled to a tubular (e.g., any suitable type of oilfield pipe, such as pipeline, drill pipe, production tubing, and the like), with the tubular containing a composition including the clay stabilizer described herein.

In some embodiments, the system can include a drillstring disposed in a wellbore, with the drillstring including a drill bit at a downhole end of the drillstring. The system can also include an annulus between the drillstring and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

In various embodiments, the present invention provides an apparatus. The apparatus can be any suitable apparatus that can use the composition including the clay stabilizer described herein in a subterranean formation, or that can perform or be generated by performance of a method for using the composition including the clay stabilizer described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

Figure 2:
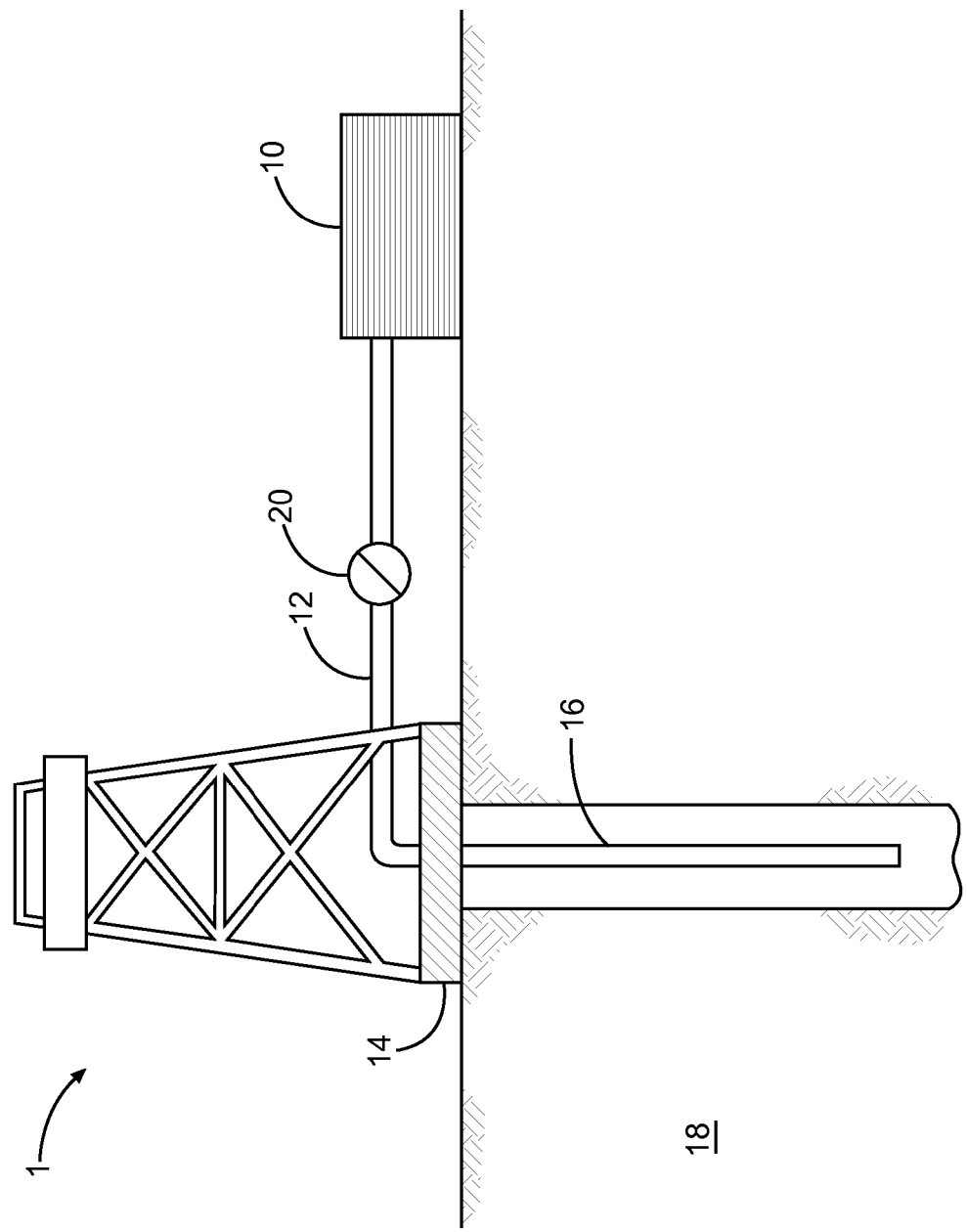
FIG. 2 illustrates a system or apparatus for delivering a composition to a subterranean formation, in accordance with various embodiments.

FIG. 2 shows an illustrative schematic of systems and apparatuses that can deliver embodiments of the compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration the clay stabilizer, or can have none of the clay stabilizer therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Composition for Treatment of a Subterranean Formation.

Various embodiments provide a composition for treatment of a subterranean formation. The composition can be any suitable composition that can be used to perform an embodiment of the method for treatment of a subterranean formation described herein.

For example, the composition can include a polymeric clay stabilizer comprising at least one ionic repeating unit. The clay stabilizer can have a melting point or glass transition temperature that is equal to or less than 100° C. The composition can be or can include a downhole fluid, such as a drilling fluid, a fracturing fluid, or a cementing fluid.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a polymeric clay stabilizer comprising at least one ionic repeating unit. The clay stabilizer can have a melting point or glass transition temperature that is equal to or less than 100° C.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
   obtaining or providing a composition comprising a polymeric clay stabilizer comprising at least one ionic repeating unit, wherein the clay stabilizer has a melting point or glass transition temperature that is equal to or less than 100° C.; and
   placing the composition in a subterranean formation.

Embodiment 2 provides the method of Embodiment 1, wherein the obtaining or providing of the composition occurs above-surface.

Embodiment 3 provides the method of any one of Embodiments 1-2, wherein the obtaining or providing of the composition occurs in the subterranean formation.

Embodiment 4 provides the method of any one of Embodiments 1-3, wherein the composition is at least one of a drilling fluid, a fracturing fluid, and a cementing fluid, or wherein the composition comprises at least one of a drilling fluid, a fracturing fluid, and a cementing fluid.

Embodiment 5 provides the method of any one of Embodiments 1-4, wherein the composition is oil- or water-based.

Embodiment 6 provides the method of any one of Embodiments 1-5, wherein the composition is a water- or oil-based emulsion.

Embodiment 7. The method of Embodiment 6, wherein the clay stabilizer is at least partially dissolved in the water- or oil-phase of the emulsion.

Embodiment 8 provides the method of any one of Embodiments 1-7, wherein the composition comprises a carrier fluid.

Embodiment 9 provides the method of Embodiment 8, wherein the carrier fluid is about 0.001 wt % to about 99.999 wt % of the composition.

Embodiment 10 provides the method of any one of Embodiments 8-9, wherein the carrier fluid is about 50 wt % to about 99.999 wt % of the composition.

Embodiment 11 provides the method of any one of Embodiments 8-10, wherein the clay stabilizer is dispersed or dissolved in the carrier fluid.

Embodiment 12 provides the method of any one of Embodiments 1-11, wherein about 0.000.1 wt % to about 99.999 wt % of the composition is the clay stabilizer.

Embodiment 13 provides the method of any one of Embodiments 1-12, wherein about 0.001 wt % to about 10 wt % or the composition is the clay stabilizer.

Embodiment 14 provides the method of any one of Embodiments 1-13, wherein the clay stabilizer is a shale stabilizer.

Embodiment 15 provides the method of any one of Embodiments 1-14, wherein the clay stabilizer is a homopolymer.

Embodiment 16 provides the method of any one of Embodiments 1-15, wherein the clay stabilizer is a copolymer.

Embodiment 17 provides the method of Embodiment 16, wherein the ionic repeating unit is about 0.01 mol % to about 99.99 mol % of the total repeating units in the clay stabilizer.

Embodiment 18 provides the method of any one of Embodiments 16-17, wherein the ionic repeating unit is about 50 mol % to 99.99 mol % of the total repeating units in the clay stabilizer.

Embodiment 19 provides the method of any one of Embodiments 1-18, wherein the melting point of the clay stabilizer is less than 30° C.

Embodiment 20 provides the method of any one of Embodiments 1-19, wherein the melting point of the clay stabilizer is about −250° C. to about 100° C.

Embodiment 21 provides the method of any one of Embodiments 1-20, wherein the clay stabilizer has a glass transition temperature of about −250° C. to about 100° C.

Embodiment 22 provides the method of any one of Embodiments 1-21, wherein the clay stabilizer has a glass transition temperature of about −100° C. to about 50° C.

Embodiment 23 provides the method of any one of Embodiments 1-22, wherein the ionic repeating unit has the structure:

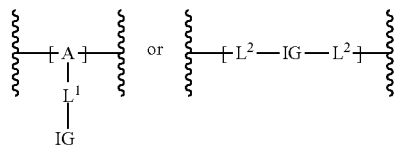

wherein
   A is selected from the group consisting of a substituted or unsubstituted($C_2$-$C_{20}$)hydrocarbylene interrupted or terminated by 0, 1, 2, or 3 atoms selected from at least one of —O—, —S—, and substituted or unsubstituted —NH—, a substituted or unsubstituted ($C_1$-$C_{10}$)heterocycle comprising at least one O, N, or S atom, and a substituted or unsubstituted siloxane or polysiloxane, $L^1$ and $L^2$ are each independently selected from the group consisting of a bond, a poly(oxy(substituted or unsubstituted($C_2$-$C_{20}$)hydrocarbylene)), a substituted or unsubstituted siloxane or polysiloxane, and a substituted or unsubstituted($C_1$-$C_{20}$)hydrocarbylene interrupted or terminated by 0, 1, 2, or 3 atoms selected from at least one of —O—, —S—, a substituted or unsubstituted —NH—, and a substituted or unsubstituted —BH—, and IG is a substituted or unsubstituted ionic group charge balanced by a counterion.

Embodiment 24 provides the method of Embodiment 23, wherein A is selected from the group consisting of a substituted or unsubstituted($C_2$-$C_{20}$)alkylene, a substituted or unsubstituted pyrrole, a substituted or unsubstituted thiophene, and a substituted or unsubstituted siloxane or polysiloxane.

Embodiment 25 provides the method of any one of Embodiments 23-24, wherein A is selected from the group consisting of a mono-($C_1$-$C_5$)alkyl-substituted ($C_2$-$C_{20}$) alkylene, a pyrrole, a thiophene, and a ($C_1$-$C_5$)alkyl-substituted siloxane or polysiloxane.

Embodiment 26 provides the method of any one of Embodiments 23-25, wherein A is selected from the group consisting of:

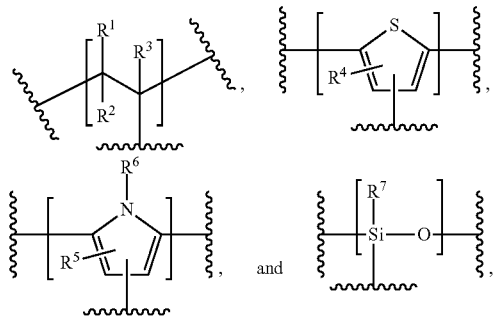

wherein $R^1$, $R^2$, $R^3$, $R^4$, $R^5$, $R^6$, and $R^7$ are each independently selected from the group consisting of —H, halide, and substituted or unsubstituted ($C_1$-$C_{20}$)hydrocarbyl interrupted by 0, 1, 2, or 3 atoms selected from —O—, —S—, and substituted or unsubstituted —NH.

Embodiment 27 provides the method of Embodiment 26, wherein $R^1$, $R^2$, $R^3$, $R^4$, $R^5$, $R^6$, and $R^7$ are each independently selected from the group consisting of —H, substituted or unsubstituted ($C_1$-$C_{20}$)alkyl, and substituted or unsubstituted ($C_1$-$C_{20}$)alkoxy.

Embodiment 28 provides the method of any one of Embodiments 26-27, wherein $R^1$, $R^2$, $R^3$, $R^4$, $R^5$, $R^6$, and $R^7$ are each independently selected from the group consisting of —H, ($C_1$-$C_5$)alkyl, and ($C_1$-$C_5$)alkoxy.

Embodiment 29 provides the method of any one of Embodiments 26-28, wherein $R^1$, $R^2$, $R^3$, $R^4$, $R^5$, $R^6$, and $R^7$ are each independently selected from the group consisting of —H, methyl, and methoxy.

Embodiment 30 provides the method of any one of Embodiments 23-29, wherein $L^1$ and $L^2$ are each independently selected from the group consisting of a bond, a poly(oxy(substituted or unsubstituted($C_2$-$C_{20}$)alkylene)), a substituted or unsubstituted siloxane or polysiloxane, and a substituted or unsubstituted($C_1$-$C_{20}$)alkylene interrupted or terminated by 0, 1, 2, or 3 atoms selected from at least one of —O—, —S—, a substituted or unsubstituted —NH—, and a substituted or unsubstituted —BH—, wherein $L^1$ and $L^2$ each independently comprise 0 or 1 bonds to an ionic group or to $L^1$ or $L^2$ of the same or a different polymer molecule.

Embodiment 31 provides the method of any one of Embodiments 23-30, wherein $L^1$ and $L^2$ are each independently selected from the group consisting of a bond, a poly(oxyethylene)), a ($C_1$-$C_5$)alkyl-substituted siloxane or polysiloxane, and a ($C_1$-$C_{10}$)alkylene interrupted or terminated by 0, 1, 2, or 3 atoms selected from at least one of —O— and a substituted or unsubstituted —NH—, and a substituted or unsubstituted —BH—.

Embodiment 32 provides the method of any one of Embodiments 23-31, wherein $L^1$ is selected from the group consisting of —C(O)O-$L^3$-, C(O)NH-$L^3$-, and -Ph-$L^3$-, wherein $L^3$ is selected from the group consisting of a bond and a ($C_1$-$C_{10}$)alkylene interrupted or terminated by 0, 1, 2, or 3 atoms selected from at least one of —O— and a substituted or unsubstituted —NH—.

Embodiment 33 provides the method of Embodiment 32, wherein $L^3$ is selected from the group consisting of a bond and a ($C_1$-$C_{10}$)alkylene.

Embodiment 34 provides the method of any one of Embodiments 23-33, wherein at each occurrence $L^2$ is independently a substituted or unsubstituted($C_1$-$C_{20}$)alkylene interrupted or terminated by 0, 1, 2, or 3 atoms selected from at least one of —O—, —S—, a substituted or unsubstituted —NH—, and a substituted or unsubstituted —BH—.

Embodiment 35 provides the method of any one of Embodiments 23-34, wherein at each occurrence $L^2$ is independently a ($C_1$-$C_{10}$)alkylene terminated by 0 or 1 ($C_1$-$C_{20}$)hydrocarbyl- or ($C_1$-$C_{20}$)hydrocarbyloxy-substituted boron atoms.

Embodiment 36 provides the method of any one of Embodiments 23-35, wherein the ionic group of IG is selected from the group consisting of a substituted or unsubstituted ($C_1$-$C_{10}$)heterocycle cation or anion comprising at least one N or S atom, a substituted or unsubstituted ammonium, a substituted or unsubstituted sulfonium, a substituted or unsubstituted phosphonium, a carboxylate, a sulfonate, a phosphonate, and a substituted or unsubstituted guanidinium, wherein the ionic group comprises 0 or 1 bonds to another ionic group or to $L^1$ or $L^2$ of the same or a different polymer molecule.

Embodiment 37 provides the method of any one of Embodiments 23-36, wherein the ionic group of IG is selected from the group consisting of a substituted or unsubstituted imidazolium, a substituted or unsubstituted pyridinium, a substituted or unsubstituted pyrrolidinium, a substituted or unsubstituted ammonium, a substituted or unsubstituted phosphonium, a carboxylate, a sulfonate, a phosphonate, and a substituted or unsubstituted guanidinium, wherein the ionic group comprises 0 or 1 bonds to another ionic group or to $L^1$ or $L^2$ of the same or a different polymer molecule.

Embodiment 38 provides the method of any one of Embodiments 23-37, wherein the ionic group of IG comprises at least one of a hydrogen halide salt, a substituted or unsubstituted ($C_1$-$C_{50}$)hydrocarbylcarboxylic acid salt, a substituted or unsubstituted $(C_1-C_{50})$hydrocarbylsulfonic acid salt, a substituted or unsubstituted $(C_1-C_{50})$hydrocarbylphosphonic acid salt.

Embodiment 39 provides the method of any one of Embodiments 23-38, wherein IG is selected from the group consisting of $-SO_3^-Y^+$, $-PO_3^-Y^+$, $-COO^-Y^+$,

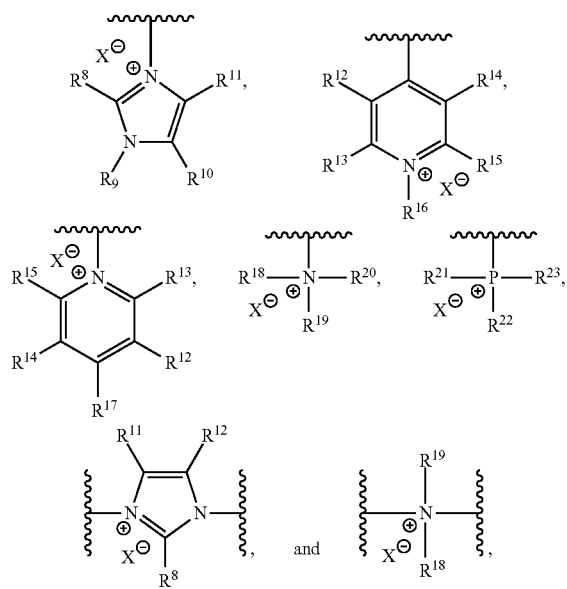

wherein $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ are each independently selected from the group consisting of $-H$, halide, and substituted or unsubstituted $(C_1-C_{20})$hydrocarbyl interrupted by 0, 1, 2, or 3 atoms selected from $-O-$, $-S-$, and substituted or unsubstituted $-NH-$, and $X^-$ or $Y^+$ is the counterion.

Embodiment 40 provides the method of Embodiment 39, wherein $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ are each independently selected from the group consisting of $-H$, substituted or unsubstituted $(C_1-C_{20})$alkyl, and substituted or unsubstituted $(C_1-C_{20})$alkoxy.

Embodiment 41 provides the method of any one of Embodiments 39-40, wherein $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ are each independently selected from the group consisting of $-H$, $(C_1-C_5)$alkyl, and $(C_1-C_5)$alkoxy.

Embodiment 42 provides the method of any one of Embodiments 39-41, wherein $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ are each independently selected from the group consisting of $-H$, methyl, methoxy, ethyl, ethoxy, propyl, propoxy, butyl, and butoxy.

Embodiment 43 provides the method of any one of Embodiments 23-42, wherein the counterion of the ionic group is selected from the group consisting of a substituted or unsubstituted cationic $(C_1-C_{10})$heterocycle, a substituted or unsubstituted ammonium, a substituted or unsubstituted phosphonium, a substituted or unsubstituted sulfonium, a substituted or unsubstituted guanidinium, $Na^+$, $K^+$, $Li^+$, $H^+$, $NH_4^+$, $Ca^{2+}$, $Mg^{2+}$, $Zn^{2+}$, and $Al^{3+}$.

Embodiment 44 provides the method of any one of Embodiments 23-43, wherein the counterion of the ionic group is selected from the group consisting of a substituted or unsubstituted imidazolium, a substituted or unsubstituted pyridinium, a substituted or unsubstituted pyrrolidinium, $N(R^{24})_4^+$, $P(R^{25})_4^+$, and $S(R^{26})_3^+$, wherein at each occurrence each of $R^{24}$, $R^{25}$, and $R^{26}$ is selected from the group consisting of $-H$, poly(oxy(substituted or unsubstituted ethyl)), and a substituted or unsubstituted$(C_1-C_{20})$hydrocarbylene interrupted or terminated by 0, 1, 2, or 3 atoms selected from at least one of $-O-$, $-S-$, and a substituted or unsubstituted $-NH-$.

Embodiment 45 provides the method of any one of Embodiments 23-44, wherein the counterion of the ionic group is a mono or di $(C_1-C_{10})$alkyl-substituted imidazolium, wherein each $(C_1-C_{10})$alkyl is independently selected.

Embodiment 46 provides the method of any one of Embodiments 23-45, wherein the counterion of the ionic group is an imidazolium bound via the 1-position and substituted at the 3-position with a group selected from methyl, ethyl, propyl, butyl, pentyl, hexyl, heptyl, octyl, nonyl, and decyl.

Embodiment 47 provides the method of any one of Embodiments 23-46, wherein the counterion of the ionic group is selected from the group consisting of $PF_6^-$, $(CF_3SO_2)_2N^-$, $B(R^{27})_4^-$, $NO_3^-$, $Cl^-$, $Br^-$, $I^-$, $F^-$, $CF_3CO_2^-$, $AsF_6^-$, $SbF_6^-$, $NO_2^-$, $SO_4^-$, perchlorate ($Cl_4O^-$), thiocyanate, cyanate, a substituted or unsubstituted $(C_1-C_{50})$hydrocarbylcarboxylate, a substituted or unsubstituted $(C_1-C_{50})$hydrocarbylsulfonate, a substituted or unsubstituted $(C_1-C_{50})$hydrocarbylsulfate, a substituted or unsubstituted $(C_1-C_{50})$hydrocarbylphosphonate, substituted or unsubstituted $(C_1-C_{50})$hydrocarbylphosphate, wherein at each occurrence $R^{27}$ is selected from the group consisting of $-H$, halo, poly(oxy(substituted or unsubstituted ethyl)), and a substituted or unsubstituted$(C_1-C_{20})$hydrocarbylene interrupted or terminated by 0, 1, 2, or 3 atoms selected from at least one of $-O-$, $-S-$, and a substituted or unsubstituted $-NH-$.

Embodiment 48 provides the method of any one of Embodiments 23-47, wherein the counterion of the ionic group is selected from the group consisting of acetate, formate, fluoro, chloro, iodo, bromo, be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, oxide, sulfide, nitride, arsenate, phosphate, arsenite, hydrogen phosphate, sulfate, thiosulfate, sulfite, carbonate, chromate, dichromate, peroxide, oxalate, methanesulfonate.

Embodiment 49 provides the method of any one of Embodiments 23-48, wherein the ionic repeating group has the structure:

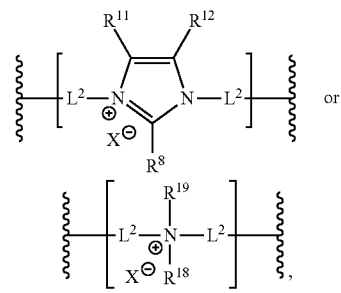

wherein

R$^8$, R$^{11}$, R$^{12}$, R$^{18}$, and R$^{19}$ are each independently selected from the group consisting of —H, substituted or unsubstituted (C$_1$-C$_{20}$)alkyl, and substituted or unsubstituted (C$_1$-C$_{20}$)alkoxy, and X$^-$ is the counterion.

Embodiment 50 provides the method of any one of Embodiments 23-49, wherein the ionic repeating group has a structure selected from the group consisting of:

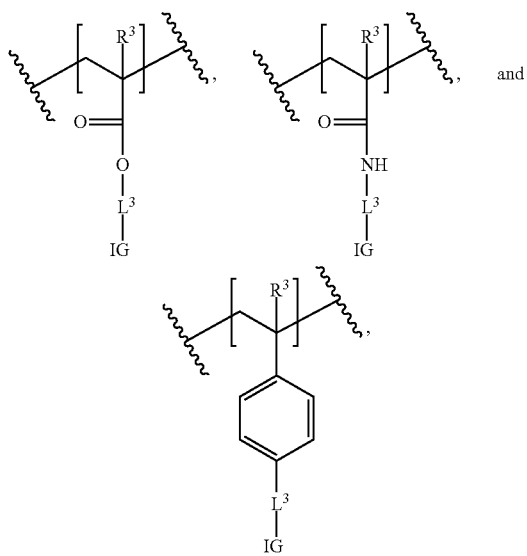

wherein

L$^3$ is selected from the group consisting of a bond and a (C$_1$-C$_{10}$)alkylene interrupted or terminated by 0, 1, 2, or 3 atoms selected from at least one of —O— and a substituted or unsubstituted —NH—.

Embodiment 51 provides the method of any one of Embodiments 23-50, wherein the ionic repeating unit is formed by polymerizing a polymerizable molecule selected from an acrylamide(C$_1$-C$_{10}$)hydrocarbylsulfonic acid, 2-acrylamido-2-methylpropane sulfonic acid (AMPS), a substituted or unsubstituted a vinylimidazolium, an ionic-group substituted styrene, an ionic-group substituted methacryloyl, a substituted or unsubstituted vinylpyridinium.

Embodiment 52 provides the method of any one of Embodiments 23-51, wherein at least one of the A, L$^1$, L$^2$, IG, and the counterion comprises at least one acidic substituent selected from the group consisting of a carboxylic acid, a sulfonic acid, and a phosphonic acid.

Embodiment 53 provides the method of any one of Embodiments 1-52, wherein the clay stabilizer has a degree of polymerization of about 2 to about 10,000,000.

Embodiment 54 provides the method of any one of Embodiments 1-53, wherein the clay stabilizer has a degree of polymerization of about 50 to about 500,000.

Embodiment 55 provides the method of any one of Embodiments 1-54, wherein the clay stabilizer has a molecular weight of about 50 to about 10,000,000.

Embodiment 56 provides the method of any one of Embodiments 1-55, wherein the clay stabilizer has a molecular weight of about 500 to about 500,000.

Embodiment 57 provides the method of any one of Embodiments 1-56, wherein the composition comprises one or more second clay stabilizers.

Embodiment 58 provides the method of Embodiment 57, wherein the second clay stabilizer is at least one of an inorganic phosphate, a polyalkoxy diamine or a salt thereof, choline or a choline derivative, an oligomethylene diamine or a salt thereof, an addition product of carboxymethyl cellulose and an organic amine, 1,2-cyclohexanediamine or a salt thereof, a salt of a phosphoric acid ester of an oxyalkylated polyol, a combination of a partially hydrolyzed acrylic copolymer potassium chloride and polyanionic cellulose, a quaternary ammonium compound, a polymer based on dialkyl aminoalkyl methacrylate, an aqueous solution containing a polymer with hydrophilic and hydrophobic groups, and a reaction product of a polyhydroxyalkane and an alkylene oxide.

Embodiment 59 provides the method of any one of Embodiments 1-58, wherein the composition further comprises a viscosifier.

Embodiment 60 provides the method of Embodiment 59, wherein the viscosifier is crosslinked or uncrosslinked.

Embodiment 61 provides the method of any one of Embodiments 59-60, wherein the viscosifier comprises at least one of a linear polysaccharide, and a polymer of a (C$_2$-C$_{50}$)hydrocarbyl having at least one carbon-carbon unsaturated aliphatic bond therein, wherein the (C$_2$-C$_{50}$) hydrocarbyl is substituted or unsubstituted.

Embodiment 62 provides the method of any one of Embodiments 1-61, wherein the composition further comprises a crosslinker.

Embodiment 63 provides the method of Embodiment 62, wherein the crosslinker comprises at least one of chromium, aluminum, antimony, zirconium, titanium, calcium, boron, iron, silicon, copper, zinc, magnesium, and an ion thereof.

Embodiment 64 provides the method of any one of Embodiments 62-63, wherein the crosslinker comprises at least one of boric acid, borax, a borate, a (C$_1$-C$_{30}$)hydrocarbylboronic acid, a (C$_1$-C$_{30}$)hydrocarbyl ester of a (C$_1$-C$_{30}$)hydrocarbylboronic acid, a (C$_1$-C$_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

Embodiment 65 provides the method of any one of Embodiments 62-64, wherein the crosslinker comprises at least one of a (C$_1$-C$_{20}$)alkylenebiacrylamide, a poly((C$_1$-C$_{20}$)alkenyl)-substituted mono- or poly-(C$_1$-C$_{20}$)alkyl ether, a poly(C$_2$-C$_{20}$)alkenylbenzene, alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate.

Embodiment 66 provides the method of any one of Embodiments 1-65, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof, to form a mixture, wherein the placing the composition in the subterranean formation comprises placing the mixture in the subterranean formation.

Embodiment 67 provides the method of Embodiment 66, wherein the cementing fluid comprises Portland cement, pozzolana cement, gypsum cement, high alumina content cement, slag cement, silica cement, or a combination thereof.

Embodiment 68 provides the method of any one of Embodiments 1-67, wherein at least one of prior to, during, and after the placing of the composition in the subterranean formation, the composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

Embodiment 69 provides the method of any one of Embodiments 1-68, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 70 provides the method of any one of Embodiments 1-69, wherein the placing of the composition in the subterranean formation comprises fracturing at least part of the subterranean formation to form at least one subterranean fracture.

Embodiment 71 provides the method of any one of Embodiments 1-70, wherein the composition further comprises a proppant, a resin-coated proppant, or a combination thereof.

Embodiment 72 provides the method of any one of Embodiments 1-71, wherein the placing of the composition in the subterranean formation comprises pumping the composition through a drill string disposed in a wellbore, through a drill bit at a downhole end of the drill string, and back above-surface through an annulus.

Embodiment 73 provides the method of Embodiment 72, further comprising processing the composition exiting the annulus with at least one fluid processing unit to generate a cleaned composition and recirculating the cleaned composition through the wellbore.

Embodiment 74 provides a system for performing the method of any one of Embodiments 1-73, the system comprising:
a tubular disposed in the subterranean formation; and
a pump configured to pump the composition in the subterranean formation through the tubular.

Embodiment 75 provides a system for performing the method of any one of Embodiments 1-74, the system comprising:
a drillstring disposed in a wellbore, the drillstring comprising a drill bit at a downhole end of the drillstring;
an annulus between the drillstring and the wellbore; and
a pump configured to circulate the composition through the drill string, through the drill bit, and back above-surface through the annulus.

Embodiment 76 provides a method of treating a subterranean formation, the method comprising:
obtaining or providing a drilling fluid, fracturing fluid, or cementing fluid comprising about 0.001 wt % to about 10 wt % of a polymeric clay stabilizer comprising at least one ionic repeating unit that is about 50 mol % to 100 mol % of the total repeating units in the clay stabilizer, the clay stabilizer having a melting point or glass transition temperature that is equal to or less than 30° C., wherein the ionic repeating unit has the structure:

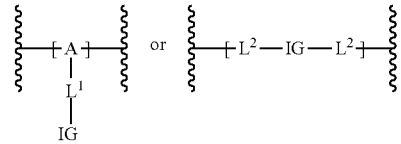

wherein
A is selected from the group consisting of a substituted or unsubstituted($C_2$-$C_{20}$)hydrocarbylene interrupted or terminated by 0, 1, 2, or 3 atoms selected from at least one of —O—, —S—, and substituted or unsubstituted —NH—, a substituted or unsubstituted ($C_1$-$C_{10}$)heterocycle comprising at least one O, N, or S atom, and a substituted or unsubstituted siloxane or polysiloxane,
$L^1$ and $L^2$ are each independently selected from the group consisting of a bond, a poly(oxy(substituted or unsubstituted($C_2$-$C_{20}$)hydrocarbylene)), a substituted or unsubstituted siloxane or polysiloxane, and a substituted or unsubstituted($C_1$-$C_{20}$)hydrocarbylene interrupted or terminated by 0, 1, 2, or 3 atoms selected from at least one of —O—, —S—, a substituted or unsubstituted —NH—, and a substituted or unsubstituted —BH—, and
IG is a substituted or unsubstituted ionic group charge balanced by a counterion; and
placing the drilling fluid, fracturing fluid, or cementing fluid in a subterranean formation.

Embodiment 77 provides a system comprising:
a composition comprising a polymeric clay stabilizer comprising at least one ionic repeating unit, wherein the clay stabilizer has a melting point or glass transition temperature that is equal to or less than 100° C.; and a subterranean formation comprising the composition therein.

Embodiment 78 provides the system of Embodiment 77, further comprising
a drillstring disposed in a wellbore, the drillstring comprising a drill bit at a downhole end of the drillstring;
an annulus between the drillstring and the wellbore; and
a pump configured to circulate the composition through the drill string, through the drill bit, and back above-surface through the annulus.

Embodiment 79 provides the system of Embodiment 78, further comprising a fluid processing unit configured to process the composition exiting the annulus to generate a cleaned drilling fluid for recirculation through the wellbore.

Embodiment 80 provides the system of any one of Embodiments 77-79, further comprising
a tubular disposed in the subterranean formation; and
a pump configured to pump the composition in the subterranean formation through the tubular.

Embodiment 81 provides a composition for treatment of a subterranean formation, the composition comprising:
a polymeric clay stabilizer comprising at least one ionic repeating unit, wherein the clay stabilizer has a melting point or glass transition temperature that is equal to or less than 100° C.

Embodiment 82 provides the composition of Embodiment 81, wherein the composition is at least one of a drilling fluid, a fracturing fluid, or a cementing fluid.

Embodiment 83 provides a drilling fluid, a fracturing fluid, or a cementing fluid for treatment of a subterranean formation, the composition comprising:
about 0.001 wt % to about 10 wt % of a polymeric clay stabilizer comprising at least one ionic repeating unit that is about 50 mol % to 100 mol % of the total repeating units in the clay stabilizer, the clay stabilizer having a melting point or glass transition temperature that is equal to or less than 30° C., wherein the ionic repeating unit has the structure:

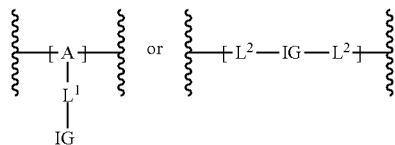

wherein
A is selected from the group consisting of a substituted or unsubstituted($C_2$-$C_{20}$)hydrocarbylene interrupted or terminated by 0, 1, 2, or 3 atoms selected from at least one of —O—, —S—, and substituted or unsubstituted —NH—, a substituted or unsubstituted ($C_1$-$C_{10}$)heterocycle comprising at least one O, N, or S atom, and a substituted or unsubstituted siloxane or polysiloxane,
$L^1$ and $L^2$ are each independently selected from the group consisting of a bond, a poly(oxy(substituted or unsubstituted($C_2$-$C_{20}$)hydrocarbylene)), a substituted or unsubstituted siloxane or polysiloxane, and a substituted or unsubstituted($C_1$-$C_{20}$)hydrocarbylene interrupted or terminated by 0, 1, 2, or 3 atoms selected from at least one of —O—, —S—, a substituted or unsubstituted —NH—, and a substituted or unsubstituted —BH—, and
IG is a substituted or unsubstituted ionic group charge balanced by a counterion.

Embodiment 84 provides a method of preparing a composition for treatment of a subterranean formation, the method comprising:
forming a composition comprising a polymeric clay stabilizer comprising at least one ionic repeating unit, wherein the clay stabilizer has a melting point or glass transition temperature that is equal to or less than 100° C.

Embodiment 85 provides the composition, apparatus, method, or system of any one or any combination of Embodiments 1-84 optionally configured such that all elements or options recited are available to use or select from.

What is claimed is:

1. A method of treating a subterranean formation, comprising:
placing a composition comprising a polymeric clay stabilizer into the subterranean formation,
wherein the polymeric clay stabilizer comprises at least one ionic repeating unit,
wherein the ionic repeating unit is about 50 mol % to 99.99 mol % of the total repeating units in the clay stabilizer, and
wherein the clay stabilizer has a melting point or glass transition temperature that is equal to or less than 100° C.

2. The method of claim 1, wherein the clay stabilizer is at least partially dissolved in a water-phase or an oil-phase of an emulsion.

3. The method of claim 1, wherein the composition comprises a carrier fluid, and wherein the carrier fluid is about 50 wt % to about 99.999 wt % of the composition.

4. The method of claim 1, wherein the melting point of the clay stabilizer is less than 30° C., or wherein the glass transition temperature of the clay stabilizer is about −100° C. to about 50° C.

5. The method of claim 1, wherein the ionic repeating unit has the structure:

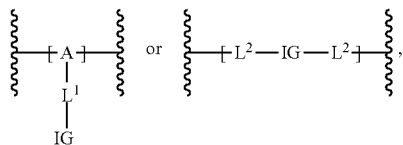

wherein:
A is selected from the group consisting of a substituted or unsubstituted ($C_2$-$C_{20}$)hydrocarbylene interrupted or terminated by 0, 1, 2, or 3 atoms selected from the group consisting of —O—, —S—, and substituted or unsubstituted —NH—, a substituted or unsubstituted ($C_1$-$C_{10}$)heterocycle comprising at least one O, N, or S atom, and a substituted or unsubstituted siloxane or polysiloxane,
$L^1$ and $L^2$ are each independently selected from the group consisting of a bond, a poly(oxy(substituted or unsubstituted ($C_2$-$C_{20}$)hydrocarbylene)), a substituted or unsubstituted siloxane or polysiloxane, and a substituted or unsubstituted ($C_1$-$C_{20}$)hydrocarbylene interrupted or terminated by 0, 1, 2, or 3 atoms selected from the group consisting of —O—, —S—, a substituted or unsubstituted —NH—, and a substituted or unsubstituted —BH—, and
IG is a substituted or unsubstituted ionic group charge balanced by a counterion.

6. The method of claim 5, wherein A is selected from the group consisting of:

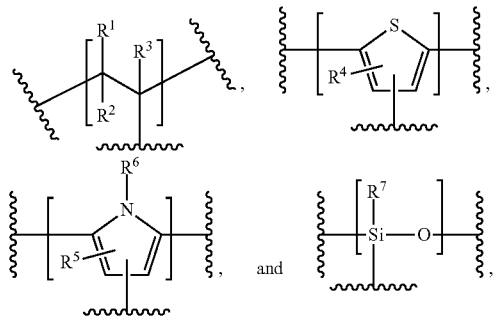

wherein $R^1$, $R^2$, $R^3$, $R^4$, $R^5$, $R^6$, and $R^7$ are each independently selected from the group consisting of —H, halide, and substituted or unsubstituted $(C_1-C_{20})$hydrocarbyl interrupted by 0, 1, 2, or 3 atoms selected from the group consisting of —O—, —S—, and substituted or unsubstituted —NH.

7. The method of claim 6, wherein $R^1$, $R^2$, $R^3$, $R^4$, $R^5$, $R^6$, and $R^7$ are each independently selected from the group consisting of —H, methyl, and methoxy.

8. The method of claim 5, wherein $L^1$ is selected from the group consisting of —C(O)O-$L^3$-, C(O)NH-$L^3$-, and —Ph-$L^3$-, wherein $L^3$ is selected from the group consisting of a bond and a $(C_1-C_{10})$alkylene interrupted or terminated by 0, 1, 2, or 3 atoms selected from the group consisting of —O— and a substituted or unsubstituted —NH—.

9. The method of claim 8, wherein $L^3$ is selected from the group consisting of a bond and a $(C_1-C_{10})$alkylene.

10. The method of claim 5, wherein at each occurrence $L^2$ is independently a substituted or unsubstituted $(C_1-C_{20})$alkylene interrupted or terminated by 0, 1, 2, or 3 atoms selected from the group consisting of —O—, —S—, a substituted or unsubstituted —NH—, and a substituted or unsubstituted —BH—.

11. The method of claim 5, wherein the ionic group of IG is selected from the group consisting of a substituted or unsubstituted imidazolium, a substituted or unsubstituted pyridinium, a substituted or unsubstituted pyrrolidinium, a substituted or unsubstituted ammonium, a substituted or unsubstituted phosphonium, a carboxylate, a sulfonate, a phosphonate, and a substituted or unsubstituted guanidinium, wherein the ionic group comprises 0 or 1 bonds to another ionic group or to $L^1$ or $L^2$ of the same or a different polymer molecule.

12. The method of claim 5, wherein the ionic group of IG is selected from the group consisting of —$SO_3^-Y^+$, —$PO_3^-Y^+$, —$COO^-Y^+$,

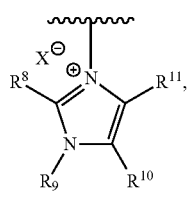

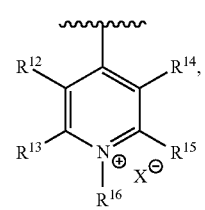

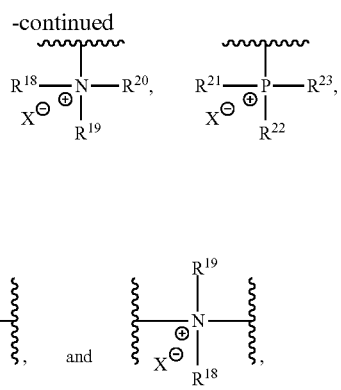

wherein:
$R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, and $R^{23}$ are each independently selected from the group consisting of —H, halide, and substituted or unsubstituted $(C_1-C_{20})$hydrocarbyl interrupted by 0, 1, 2, or 3 atoms selected from the group consisting of —O—, —S—, and substituted or unsubstituted —NH, and $X^-$ or $Y^+$ is the counterion.

13. The method of claim 12, wherein $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$ and $R^{23}$ are each independently selected from the group consisting of —H, methyl, methoxy, ethyl, ethoxy, propyl, propoxy, butyl, and butoxy.

14. The method of claim 5, wherein the ionic repeating group has the structure:

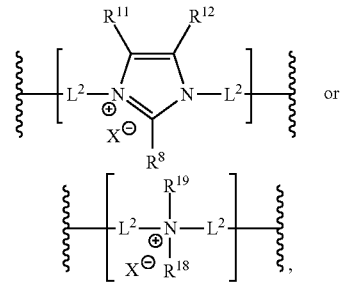

wherein:
$R^8$, $R^{11}$, $R^{12}$, $R^{18}$ and $R^{19}$ are each independently selected from the group consisting of —H, substituted or unsubstituted $(C_1-C_{20})$alkyl, and substituted or unsubstituted $(C_1-C_{20})$alkoxy, and
$X^-$ is the counterion.

15. The method of claim 5, wherein the ionic repeating group has a structure selected from the group consisting of:

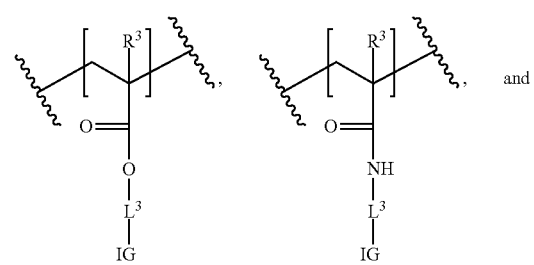

-continued

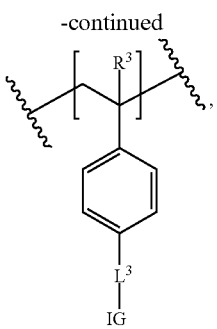

wherein:
L³ is selected from the group consisting of a bond and a (C₁-C₁₀)alkylene interrupted or terminated by 0, 1, 2, or 3 atoms selected from the group consisting of —O— and a substituted or unsubstituted —NH—.

16. A method of treating a subterranean formation, comprising:
placing a drilling fluid, fracturing fluid, or cementing fluid into the subterranean formation,
wherein the drilling fluid, fracturing fluid, or cementing fluid comprises about 0.001 wt % to about 10 wt % of a polymeric clay stabilizer comprising at least one ionic repeating unit that is about 50 mol % to 100 mol % of the total repeating units in the clay stabilizer, the clay stabilizer having a melting point or glass transition temperature that is equal to or less than 30° C.,
wherein the ionic repeating unit has the structure:

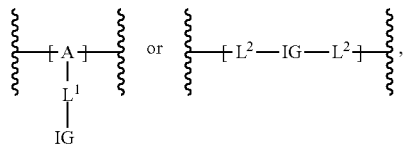

wherein:
A is selected from the group consisting of a substituted or unsubstituted (C₂-C₂₀)hydrocarbylene interrupted or terminated by 0, 1, 2, or 3 atoms selected from the group consisting of —O—, —S—, and substituted or unsubstituted —NH—, a substituted or unsubstituted (C₁-C₁₀)heterocycle comprising at least one O, N, or S atom, and a substituted or unsubstituted siloxane or polysiloxane,
L¹ and L² are each independently selected from the group consisting of a bond, a poly(oxy(substituted or unsubstituted (C₂-C₂₀)hydrocarbylene)), a substituted or unsubstituted siloxane or polysiloxane, and a substituted or unsubstituted (C₁-C₂₀)hydrocarbylene interrupted or terminated by 0, 1, 2, or 3 atoms selected from the group consisting of —O—, —S—, a substituted or unsubstituted —NH—, and a substituted or unsubstituted —BH—, and IG is a substituted or unsubstituted ionic group charge balanced by a counterion.

17. A system for practicing the method of claim 16, comprising:
a drillstring disposed in a wellbore, the drillstring comprising a drill bit at a downhole end of the drillstring, wherein the wellbore is located in the subterranean formation;
an annulus between the drillstring and the wellbore; and
a pump configured to circulate the drilling fluid, fracturing fluid, or cementing fluid through the drill string, through the drill bit, and back above-surface through the annulus.

18. The system of claim 17, further comprising a fluid processing unit configured to process the drilling fluid, fracturing fluid, or cementing fluid exiting the annulus to generate a cleaned fluid for recirculation through the wellbore.

19. The system of claim 17, further comprising:
a tubular disposed in the subterranean formation; and
a pump configured to pump the drilling fluid, fracturing fluid, or cementing fluid in the subterranean formation through the tubular.

20. A drilling fluid, a fracturing fluid, or a cementing fluid for treatment of a subterranean formation, comprising:
about 0.001 wt % to about 10 wt % of a polymeric clay stabilizer comprising at least one ionic repeating unit that is about 50 mol % to 100 mol % of the total repeating units in the clay stabilizer, the clay stabilizer having a melting point or glass transition temperature that is equal to or less than 30° C., wherein the ionic repeating unit has the structure:

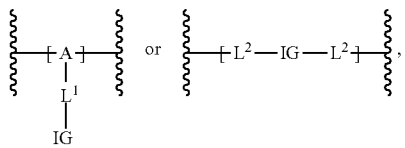

wherein:
A is selected from the group consisting of a substituted or unsubstituted (C₂-C₂₀)hydrocarbylene interrupted or terminated by 0, 1, 2, or 3 atoms selected from the group consisting of —O—, —S—, and substituted or unsubstituted —NH—, a substituted or unsubstituted (C₁-C₁₀)heterocycle comprising at least one O, N, or S atom, and a substituted or unsubstituted siloxane or polysiloxane,
L¹ and L² are each independently selected from the group consisting of a bond, a poly(oxy(substituted or unsubstituted (C₂-C₂₀)hydrocarbylene)), a substituted or unsubstituted siloxane or polysiloxane, and a substituted or unsubstituted (C₁-C₂₀)hydrocarbylene interrupted or terminated by 0, 1, 2, or 3 atoms selected from the group consisting of —O—, —S—, a substituted or unsubstituted —NH—, and a substituted or unsubstituted —BH—, and
IG is a substituted or unsubstituted ionic group charge balanced by a counterion.

* * * * *